3,551,205
COMPOSITE PAPER ELECTRODE FOR A VOLTAIC CELL
Anthony Vincent Fraioli, Essex Fells, N.J., and William Austin Barber, Stamford, and Allan Murry Feldman, Norwalk, Conn., assignors to American Cyanamid Company, Stamford, Conn., a corporation of Maine
No Drawing. Filed Dec. 5, 1968, Ser. No. 781,577
Int. Cl. H01m 35/02
U.S. Cl. 136—22        8 Claims

ABSTRACT OF THE DISCLOSURE

Paper electrodes useful in voltaic cells consist of a water-laid web of fibers, e.g., asbestos and cathode active electroconductive particles, e.g., acetylene black with an electroconductive scrim incorporated within the web structure. The flexible paper electrode sheet is especially suitable for shaped electrode structures such as a rolled cathode in a cell. The electrodes have advantage of high porosity providing void space for collection of solid depolarization product during cell discharge. A lithium/$SO_2$/carbon cell with the paper cathode has excellent capacity and high power/weight ratio.

---

The invention relates to voltaic cells and particularly to electrodes useful as cathodes in voltaic cells.

U.S. Pat. No. 3,348,974, patented Oct. 24, 1967, on application of Barber and Woodberry, filed July 1, 1963, describes paper electrodes for a fuel cell. Those paper electrodes, which were especially designed for use in a fuel cell, consisted of a fibrous paper matrix with a high proportion of carbon dispersed in the fibrous matrix. The carbon has on its surface a fuel cell catalyst, usually platinum. Those electrodes were made by paper-making techniques in which the fiber and carbon were formed into a self-supporting paper sheet.

Electrodes of the present invention similarly comprise, as one component, a fibrous paper matrix with high proportion of incorporated carbon or other conductive particles and they are similarly made by forming a water-laid felted paper web. While they may be adapted for use as fuel cell electrodes, the electrodes of the present invention are especially advantageous for use as a cathode in a primary cell or secondary cell that employs a non-aqueous electrolyte, and especially advantageous for use as a cathode in such a primary cell in which the cathode depolarizers are dissolved in the electrolyte and in which there is no need for depolarizer as an incorporated component of the cathode. For example, in a non-aqueous electrolytic cell of the kind described in the Belgium Pat. No. 705,559, patented Oct. 24, 1967, the electrolyte comprises, as one essential component, sulfur dioxide which functions during cell discharge as the major cathode depolarizer. In such a cell an electrode of the present invention is particunrlarly useful as a cathode because it has ample porous structure within the fibrous web to provide sites at the electrode for deposit of solid cathode depolarization products, which in the case of the $SO_2$ cell are only very slightly soluble dithionites of the anode metal.

An electrode in accordance with the invention consists of a sheet material which comprises an electrically conductive metal grid sheet, e.g., an expanded metal sheet, wire screen or the like, enclosed within a water-laid fibrous web which has high concentration of carbon particles or other electroconductive cathode material dispersed throughout said web. The conductive metal grid serves as a backbone or scrim to stiffen and strengthen the sheet structure, provides an auxiliary current distributor through the electrode sheet and provides means for connecting the electrode to a metal terminal.

The term "water-laid" is used herein to describe a method by which a fibrous paper web is formed, whether the vehicle is water or other suitable liquid. The method of making water-laid papers is commonly known in papermaking arts. A fluid slurry of discrete fibers and particles dispersed in liquid is cast on a screen which collects and retains the fibers and particles which form a felted mat as the suspending liquid is drawn through the screen. The water-laid paper sheet thus formed on the screen is then removed from the screen and further processed, as by pressing, drying, etc., into a finished paper product. In making an electrode according to the invention, a conductive metal grid is incorporated as a core within the sheet as the water-laid web is formed on the screen.

Casting of the paper web onto a screen from a fluid slurry of the fibers and conductive particles is facilitated by the fact that there are no cathode depolarizer compounds that must be incorporated in the electrode structure; essential components of the web portion of the electrode are simply the fibrous material and particles of cathode-active material, preferably carbon. Certain preferred embodiments may also employ a binder, provided the binder is one that will not clog the pores in the web and that will not insulate the conductive particles. All materials of the electrode must be essentially insoluble in the electrolyte for which the cell is designed. For example, in a cell designed for use with an electrolyte comprising organic solvents, the electrode components, i.e., the fibers, conductive particles, binders and any other components in the finished electrode, must be selected to be insoluble in the organic solvents of the electrolyte.

By incorporating the metal grid within the sheet as the water-laid web is being formed, there is obtained by direct engagement of fibers and carbon particles of the web with the metal grid, an integral union, both mechanical and electrical, between the grid and the web which is much preferable to that which would be obtained by first making a paper sheet and then bonding it to a metal grid by means of adhesives. Electrodes constructed according to the invention are especially well adapted for forming into shapes as by winding a rolled cathode for the cell. Excellent porosity and permeability of the web permit absorption and circulation of the electrolyte within the cathode structure. The metal grid serves as a scrim which permits sufficient flexibility for winding the sheet into a roll while lending rigidity to the rolled paper structure. The conductive grid prevents electrical isolation of sections of the cathode which might occur through tearing or by clogging a section of the electrode during discharge.

Within the paper web portion of the electrode the fiber components intermesh to form an integral sheet structure the same as do fibrous components of other papers. This structure provides a holding and reinforcing matrix for the conductive particles of carbon or the like, dispersed through the web; the conductive particles provide surface area for electrolytic action of the cathode in the cell. The fibrous structure of the web also provides voids within the electrode in which insoluble reduction products of depolarization can be deposited and held at the cathode as those products are formed during cell discharge. In a primary cell, high porosity of the electrode is necessary to long cell life. As the cell is discharged accumulation of depolarization products in the pores of the electrode will eventually isolate the cathode material from the electrolyte as the pores are filled. Thus, the high porosity of the electrode will extend cell life by providing enough space to hold discharge products without clogging. In preferred embodiments, electrodes according to the invention will be of porosity in the range from 65 to 95 percent based on pore volume as a proportion of the total electrode volume.

Fibers suitable for making electrodes in accordance with the present invention may include cellulosic fibers such as wood pulp, cotton, linen or rag fibers, and the like; synthetic fibers such as polyethylene and polypropylene, rayon, nylon, various polyester fibers, for example poly [ethylene terephthalate], and the like. Inorganic fibers such as asbestos fibers, glass fibers, and the like are especially suitable for improved tear strength we may select fibers that are very slightly soluble in the slurry medium, for example, when the paper is cast from a water slurry the fibers might include some proportion of slightly soluble polyvinyl alcohol fibers. In the water-laid mat, as the water is removed by drying, these slightly soluble polyvinyl alcohol fibers tend to adhere at fiber junctions thereby providing additional tear strength. Also, in the slurry the soluble polyvinyl alcohol tends to flocculate the conductive particles, e.g., carbon, thus improving retention of non-fibrous conductive particles in the web as the paper is cast on the screen. To provide additional porosity in the web one may employ fibers which are insoluble in the slurry medium but which are selectively soluble in another solvent, e.g., in an organic solvent, with which the cast paper may be subsequently washed to remove the soluble fibers leaving additional void space within the web. In other embodiments the fibers may include or even consist entirely of fibrous carbon such as fibrous graphite. In this case the graphite fibers function doubly as fibers which form the porous web and as cathode-active conductive material providing at least a part of the cathode surface area. Inorganic fibers such as glass and asbestos fibers are especially preferred in systems employing organic solvent electrolytes because these materials are least likely to contain soluble organic materials that might dissolve in the electrolyte and reduce cell efficiency.

The conductive particle components of the paper web will comprise a suitable cathode material, preferably carbon particles such as acetylene black or amorphous carbon blacks, graphite in any of its various forms, and the like. Metal particles may be employed either alone or in mixture with carbon. In one embodiment of the invention fine flakes of aluminum incorporated in lesser proportions with the cathode-active carbon in the slurry tend to improve conductivity and surface characteristics of the finished electrode. In the fibrous web it is necessary to have a sufficient proportion of electroconductive particles to form a contacting network of electroconductive particles throughout the electrode structure. Preferably the surface resistivity of the cathode should not exceed 50 ohms per square. The conductive cathode-active material in the web provides the surface area for cathodic action of the electrode. The proportion of conductive cathode-active material, then, largely determines the available cathode area. Therefore, in accordance with the present invention, in the paper web portion of the electrode the web comprises at least 25% by weight of conductive cathode-active material dispersed in the web. In preferred embodiments the proportion of cathodic particles in the web will usually be in the range from 50% to 90% by weight, exclusive of the weight of the metal grid.

The metal grid incorporated in the paper electrode may be of any suitable conductive metal such as platinum, nickel, valve metals such as aluminum and tantalum, and the like. The grid may be in the form of an expanded metal grid or it may be in another suitable form such as metal screen or wire cloth. The metal should be one that resists corrosion in the electrolyte. Preferably the grid is of a material sufficiently flexible to permit shaping of the electrode as by winding the electrode into a cell.

As mentioned before, one object of the invention is to provide an electrode having adequate void space within the porous web to receive deposits of insoluble depolarization products formed at the cathode surface during discharge. For this reason, the water-laid web is particularly advantageous because a unitary web structure is provided with adequate cellular voids for the purpose.

By contrast, an electrode made by spreading a paste that contains carbon and fibers on the screen would have much less void cellular volume within its structure because most of such space would be filled with binder materials necessary to make the paste and to form a cohesive web on the metal grid by a paste moulding method. In prior art, such paste-applied electrodes have been loaded with solid depolarizer compounds. By employing the water-laid paper-making method a cohesive web is obtained in some embodiments without need for any non-fibrous binding material and in other embodiments with need for no more than minimal non-fibrous cohesive binder in the finished web.

An especially preferred binder is colloidal polytetrafluoroethylene aqueous emulsion which is added to the slurry with fibers and conducting materials before the web is cast. By vigorous mechanical agitation of the slurry the colloidal suspension is broken and the polytetrafluoroethylene is coagulated in the slurry. Precipitation and coagulation of polytetrafluoroethylene in the slurry can be facilitated by addition of acetone to the aqueous slurry during the mechanical agitation. When the slurry is cast to form the web, polytetrafluoroethylene extends throughout the web binding the carbon particles with the fibers. Once dried, the polytetrafluoroethylene is resistant to most organic solvents and is an insoluble component suitable for use in many organic and aqueous electrolyte systems. Other polymeric materials that can be coagulated in water or other liquid slurry medium may be used similarly. Polyvinyl alcohol is a useful binder of this kind.

The web may be water-laid from an aqueous slurry or, if desired, from another liquid slurry medium.

Following are examples presented to set forth the best mode presently contemplated of carrying out the invention by reference to specific details of certain preferred embodiments. Full scope of the invention may extend beyond the specific detail of these examples.

EXAMPLE 1

Preparation of paper sheets

A sheet of cathode paper is prepared as follows: Long fiber asbestos (0.85 gm. Baker and Adamson Code 1393) is beaten by rapid agitation of 300 cc. water slurry for about five minutes to loosen and separate the fibers prior to mixing with other ingredients. Then slurry is made by adding to the asbestos slurry, while stirring:

Acetylene black (Shawinigan 50% compression)—8.5 gm.
Polytetrafluoroethylene 60% solids emulsion (Du Pont Teflon type 30 B)—1.4 gm. and
Water—1500 ml.

Then 1500 ml. of acetone is added and the slurry is beaten in a one gallon Waring blender for 30 seconds to one minute. This causes demulsification and coagulation of the polytetrafluoroethylene. A 10″ x 12″ hand sheet paper-making machine is filled with water up to the screen. A level 150 mesh copper screen may be used, but preferably it is covered with an auxiliary screen of porous polytetrafluoroethylene sheet (Zitex K 233–122 D1-FCUN) which has been found to improve carbon particle retention in the paper and it can be most easily separated from the formed sheet. Over the screen is poured the slurry of paper-making materials described above. The slurry is well mixed as the drain is opened below the screen and liquid is rapidly drawn from the bottom of the machine depositing the solids on the screen cover. After the machine has drained, air is drawn through the web of carbon and asbestos which has matted on the polytetrafluoroethylene screen cover. Then a sheet of aluminum expanded metal (Exmet 6–A1–7–1/0) is laid on top of the mat and clamped down at its edges. Another identical slurry, prepared exactly as before, is poured in above the screen. The liquids are drawn off exactly as before and air is drawn through the mat for a few minutes to remove residual water.

The formed paper web of fibers, carbon and incorporated metal grid is then covered with another polytetrafluoroethylene sheet like the screen cover. The composite of paper and polytetrafluoroethylene sheets is lifted from the machine, covered on both sides with blotting paper, wrapped in a towel and carefully calendered to remove residual water. The formed paper sheet is then separated from the covering sheets and dried on a polished steel drying drum at 240° F. After the sheet has been thoroughly dried it is cut into strips for making electrodes. Thickness of the finished paper is .035 in., porosity about 90%. A second paper electrode sheet is prepared exactly as described above except the slurry further includes 0.85 gm. of fine aluminum flake (Alcoa Albron Grade 606) and instead of 1.4 gms. polytetrafluoroethylene emulsion there is used 3.5 gm. of the same emulsion. A third sheet is prepared exactly as the first except instead of 1.4 gm. polytetrafluoroethylene emulsion there is used 7.0 gm. of the same polytetrafluoroethylene emulsion. Surface resistivity of all the sheets was less than 50 ohms per square. Conductivity of the sheets containing aluminum flake was improved by presence of the aluminum flake.

EXAMPLE 2

The paper electrode prepared first in Example 1 above is made into strips and a terminal tab is welded to the metal grid at the end of each strip. Each strip is then incorporated as a layer in a sandwich with other elements that will make up an electrode coil. The arrangement of layers in the sandwich is as follows, all layers of the same length and width. An anode strip of lithium foil is interleaved between two sheets of paper separator. The paper cathode is also interleaved between two sheets of the same separator paper. The interleaved anode is placed over the interleaved cathode with the terminal tabs of the electrodes at opposite ends of the strip. The sandwich is wound from the end with the cathode tab so the coil has a cathode tab at the center and an anode tab at the outer edge of the coil. The anode terminal tab is connected to the wall of a steel battery enclosure can and the coil is placed inside. Then the cathode terminal tab is connected to a metal cover having a valve and the cover is sealed into the top of the can with electrical insulation between can and cover. The valve in the cover is opened, the can is pumped clear of air, purged with $SO_2$, pumped out again, then filled with electrolyte. The valve is then sealed shut. A detailed description of the can and cover can be found in U.S. patent application Ser. No. 630,998, filed Apr. 14, 1967, now Pat. No. 3,475,226, by A. V. Fraioli, titled "Combination Electrical Feed-Through and Filling Tube Used in Conjunction With a Battery Case." The cell is filled with an electrolyte prepared by mixing 164.2 gms. acetonitrile, 130.5 gms. propylene carbonate, 160 gms. lithium bromide and 1073 gms. sulfur dioxide.

Open circuit voltage of the cell is about 2.8 volts. The cell is tested for performance and capacity by discharging at ¼ ampere steadily to 1.8 volt cut off. The cell performs at average 2.7 volts. Measured capacity of the cathode (limiting element in this cell) is 29,300 coulombs/in.$^3$. The power capacity test rating for this cell is 135 watt hours per pound cell weight.

Other cathodes prepared as described in Example 1 will deliver similar high capacity performance in a cell of the same construction.

Use of paper cathodes is illustrated in the examples above by reference to certain non-aqueous cells in which cathodes of the invention are found to be of particular advantage. It will be understood that use of the novel paper electrodes is not necessarily limited to such cells and these electrodes may be found useful as cathodes for other voltaic cells of different structure and different components.

Variations from the examples above also may be made within the scope of the invention with regard to choice of materials for the essential components of a composite electrode of the invention. Also variations may be made within the scope of the invention as it relates to the lithium/$SO_2$/ carbon cells described. Variations may be made in choice of electrolyte components such as non-aqueous solvents and electrolyte salts, proportions of components, shape and form of the cell enclosure, etc., all within the scope of the invention.

We claim:
1. A cathode member for a voltaic cell consisting of a porous paper sheet which consists of a scrim of metal grid sheet covered by and incorporated in said sheet with an unsintered porous web, said web comprising a mixture of water-laid intermeshed fibers and carbon particles, said carbon particles comprising 25–90 percent by weight of said web and forming an electro-conductive network in said web, said web having at least 65 percent porosity by volume and the web surface of said sheet having surface resistivity less than 50 ohms per square.

2. A cathode member defined by claim 1 wherein the carbon particles of said web comprise acetylene carbon black particles.

3. A cathode member defined by claim 1 wherein the water-laid fibers of said web comprise fibers of asbestos.

4. A cathode member defined by claim 1 wherein the said metal grid sheet material is aluminum.

5. A cathode member defined by claim 1 wherein said web further comprises dispersed particles of electroconductive metal in addition to said carbon particles.

6. A cathode member defined by claim 5 wherein said additional electroconductive metal particles consist of particles of aluminum.

7. A cathode member defined by claim 1 wherein said water-laid web further comprises an unsintered binder dispersed in said web.

8. A cathode member defined by claim 7 wherein said binder is unsintered polytetrafluoroethylene.

References Cited

UNITED STATES PATENTS

| | | | |
|---|---|---|---|
| 3,328,205 | 6/1967 | Barber et al. | 136—120FC |
| 3,411,954 | 11/1968 | Richman | 136—120 |
| 3,413,239 | 11/1968 | Olstowski et al. | 136—121 |
| 3,436,270 | 4/1969 | Oswin et al. | 136—120FC |
| 3,440,107 | 4/1969 | Barber | 136—120FC |
| 3,442,714 | 5/1969 | Matsuno | 136—120FC |

WINSTON A. DOUGLAS, Primary Examiner

C. F. LEFEVOUR, Assistant Examiner

U.S. Cl. X.R.

136—121

UNITED STATES PATENT OFFICE
CERTIFICATE OF CORRECTION

Patent No. 3,551,205          Dated December 29, 1970

Inventor(s) ANTHONY VINCENT FRAIOLI, WILLIAM AUSTIN BARBER AN ALLEN MURRY FELDMAN It is certified that error appears in the above-identified patent and that said Letters Patent are hereby corrected as shown below:

Column 1, line 55, cancel "particunlarly" and substitute -- particularly -- .

Column 3, line 6, cancel "especially suitable for improved tear strength we may se- " and substitute -- especially suitable. For improved tear strength we may Column 3, line 68, cancel "cell" and substitute -- coil --

Signed and sealed this 30th day of March 1971.

(SEAL)
Attest:

EDWARD M. FLETCHER, JR.
Attesting Officer

WILLIAM E. SCHUYLER, JR.
Commissioner of Patents